US008448200B2

(12) United States Patent
Takeshita

(10) Patent No.: US 8,448,200 B2
(45) Date of Patent: May 21, 2013

(54) TRANSFERRED MEDIUM

(75) Inventor: Sanshiro Takeshita, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 13/365,663

(22) Filed: Feb. 3, 2012

(65) Prior Publication Data

US 2012/0133717 A1 May 31, 2012

Related U.S. Application Data

(60) Continuation of application No. 12/857,281, filed on Aug. 16, 2010, which is a continuation of application No. 12/570,432, filed on Sep. 30, 2009, now Pat. No. 8,018,477, which is a division of application No. 11/270,853, filed on Nov. 8, 2005, now abandoned.

(30) Foreign Application Priority Data

Nov. 8, 2004 (JP) ................................ 2004-323430

(51) Int. Cl.

| | |
|---|---|
| ***G11B 17/03*** | (2006.01) |
| ***B41J 2/01*** | (2006.01) |
| ***B41J 2/435*** | (2006.01) |
| ***G01D 15/06*** | (2006.01) |
| ***G01D 15/16*** | (2006.01) |

(52) U.S. Cl.

USPC ........... 720/695; 720/632; 347/105; 347/164; 347/215; 347/217; 347/262

(58) Field of Classification Search

USPC .......... 347/105, 164, 215, 217, 262; 720/632, 720/695

See application file for complete search history.

(56) References Cited

U.S. PATENT DOCUMENTS 5,192,071 A 3/1993 Kodama
6,612,762 B1 9/2003 Sakurai et al.

(Continued)

FOREIGN PATENT DOCUMENTS

EP 1 057 651 A2 12/2000
JP 2-67329 U 3/1990

(Continued)

OTHER PUBLICATIONS

European Search Report No. 05024300.5 dated Apr. 19, 2006.

(Continued)

*Primary Examiner* — Stephen Meier
*Assistant Examiner* — Sarah Al Hashimi
(74) *Attorney, Agent, or Firm* — Nutter McClennen & Fish LLP; John J. Penny, Jr.; Rory P. Pheiffer

(57) ABSTRACT

A transferred medium is provided. In one exemplary embodiment a transferred medium includes a projection part projected in a transferring direction of the transferred medium from a front end part of the medium such that the projection part traverses the front end part of the medium. The thickness of a part of the projection part can be configured to be greater than the thickness of the front end part, the width of the projection part in a direction perpendicular to the transferring direction can be narrower than the width of the front part in that same direction, and the urging force by the urging member can act on the projection part and the front end part during transfer of the transferred medium. A recording apparatus system that includes a transferred medium is also provided, as are other embodiments of a transferred medium.

7 Claims, 10 Drawing Sheets

U.S. PATENT DOCUMENTS

| | | | |
|---|---|---|---|
| 8,018,477 | B2 | 9/2011 | Takeshita |
| 2001/0012259 | A1 * | 8/2001 | Ogawa .......................... 369/178 |
| 2002/0067940 | A1 | 6/2002 | Sasai et al. |
| 2003/0085513 | A1 | 5/2003 | Takahara et al. |
| 2003/0185132 | A1 | 10/2003 | Ariyoshi |
| 2003/0234852 | A1 | 12/2003 | Oshima et al. |
| 2004/0017462 | A1 | 1/2004 | Takahashi et al. |
| 2004/0041880 | A1 | 3/2004 | Ikeda et al. |
| 2004/0141791 | A1 | 7/2004 | Obara |
| 2006/0119694 | A1 | 6/2006 | Takeshita |
| 2008/0229340 | A1 | 9/2008 | Miyazaki |
| 2010/0085407 | A1 | 4/2010 | Takeshita |
| 2010/0302333 | A1 | 12/2010 | Takeshita |
| 2010/0309271 | A1 | 12/2010 | Takeshita |

FOREIGN PATENT DOCUMENTS

| | | | |
|---|---|---|---|
| JP | H02-123934 | U | 10/1990 |
| JP | 2002-302295 | A | 10/2002 |
| JP | 2002355956 | A | 12/2002 |
| JP | 2004-042384 | A | 2/2004 |
| JP | 2004043095 | A | 2/2004 |
| JP | 2004-284822 | A | 10/2004 |

OTHER PUBLICATIONS

Japanese Office Action (Original and Translation) issued Oct. 25, 2011 for Application No. 2010-101932.

Notice of Allowance issued May 19, 2011 for U.S. Appl. No. 12/570,432.

Notice of Allowance issued Oct. 11, 2011 for U.S. Appl. No. 12/857,281.

U.S. Office Action issued Dec. 30, 2011 for U.S. Appl. No. 12/857,281.

U.S. Office Action issued Oct. 12, 2011 for U.S. Appl. No. 12/857,256.

U.S. Office Action issued Nov. 29, 2010 for U.S. Appl. No. 12/570,432.

U.S. Office Action issued Jul. 6, 2009 for U.S. Appl. No. 11/270,853.

U.S. Office Action issued Jan. 15, 2009 for U.S. Appl. No. 11/270,853.

U.S. Office Action issued Jul. 10, 2008 for U.S. Appl. No. 11/270,853.

* cited by examiner

TRANSFERRED MEDIUM

RELATED APPLICATIONS

The present application is a continuation of and claims priority under 35 U.S.C. §120 to U.S. patent application Ser. No. 12/857,281 filed on Aug. 16, 2010, and entitled "TRANSFERRED MEDIUM," which itself if a continuation application of U.S. Pat. No. 8,018,477 filed on Sep. 30, 2009, issued on Sep. 13, 2011, and entitled "TRANSFERRED MEDIUM," which itself is a divisional application of and claims priority under 35 U.S.C. §120 to U.S. patent application Ser. No. 11/270,853 filed on Nov. 8, 2005 now abandoned, and entitled "Transferred Medium," each of which is hereby incorporated by reference in its entirety. The present application also claims priority under 35 U.S.C. §119 to Japanese Patent Application No. 2004-323430, filed on Nov. 8, 2004, which is hereby incorporated by reference in its entirety.

BACKGROUND OF THE INVENTION

1. Technical Field of the Invention

The present invention relates to a transferred medium having a plate shape that can be nipped between a feed driving roller which rotates and a feed driven roller which rotates in close contact with the feed driving roller and being transferred in a secondary scan direction in response to the rotation of the feed driving roller.

2. Description of the Related Art

Inkjet printers as an example of a recording apparatus or a liquid jetting apparatus may perform printing by ejecting ink droplets onto a label surface of an optical disk as a thin plate member such as a compact disk (CD) or a digital versatile disk (DVD). In such inset printers, the thin plate member such as an optical disk is generally set in a tray having a plate shape, is fed over a feeding path in the inkjet printers (transferred in a secondary scan direction) with the thin plate member set in the tray, and then is subjected to printing.

Here, the tray is fed in the secondary scan direction by the rotation of a feed driving roller in the state that the tray is nipped between the feed driving roller and a feed driven roller. However, when the tray is transferred in the secondary scan direction (fed) with the feed driving roller and the feed driven roller, the tray must be inserted between the feed driving roller and the feed driven roller. Since the feed driven roller is strongly pressed on the feed driving roller, there is known an inkjet printer having a means for releasing the feed driven roller from the feed driving roller by the use of a lever as a means for inserting the tray between both rollers as disclosed in Japanese Unexamined Patent Application Publication No. 2002-355956 (hereinafter, referred to as JP '956).

A tray in which a film having the shape of a thin sheet is attached to the front end of the tray is disclosed in Japanese Unexamined Patent Application Publication No. 200442384 (hereinafter, referred to as JP '384). Accordingly, when feeding the tray, the thin film is first inserted between the feed driving roller and the feed driven roller and the tray body is then inserted between the feed driving roller and the feed driven roller as a result. Therefore, a means for releasing the feed driven roller disclosed in JP '956 is not necessary.

In the tray disclosed in JP '384, the means for releasing the feed driven roller is not necessary by providing a thin film at the front end of the tray. However, in the structure employing the thin film, since a process of attaching the thin film thereto is required, there are problems in that increase in cost can be caused and the thin film can be easily damaged. Specifically, when the tray is inserted into the printer, the thin film provided at the front end of the tray can be easily destroyed due to the forcible insertion of the tray into the printer.

SUMMARY OF THE INVENTION

The present invention is contrived to solve the above-mentioned problems. It is an object of the present invention to provide a transferred medium, which can be nipped between a feed driving roller and a feed driven roller without releasing the feed driven roller, with low cost and without being easily destroyed and more particularly to provide a transferred medium having a structure for allowing the transferred medium to be easily nipped between a feed driving roller and a feed driven roller. The invention is as follows.

In order to accomplish the above-mentioned object, according to an aspect of the present invention, there is provided a transferred medium having a plate shape that can be nipped between a feed driving roller which rotates and a feed driven roller which rotates in close contact with the feed driving roller and being transferred in a secondary scan direction in response to the rotation of the feed driving roller, wherein a stress concentrated part, on which stress acting on the transferred medium when the transferred medium is nipped between the feed driving roller and the feed driven roller is concentrated, is integrally formed at the front end of the transferred medium with the transferred medium.

According to the aspect described above, the stress concentrated part on which the stress acting on the transferred medium is concentrated when the transferred medium is nipped between the feed driving roller and the feed driven roller is integrally formed at the front end of the transferred medium with the transferred medium. Accordingly, when the transferred medium is nipped between the feed driving roller and the feed driven roller, the stress concentrated part is first inserted between the feed driving roller and the feed driven roller, the main body of the transferred medium is then inserted between the feed driving roller and the feed driven roller, and the transferred medium is finally nipped between both rollers. That is, since the area of the front end of the transferred medium (as seen in the plan view) is extremely reduced by the stress concentrated part, the front end of the transferred medium can be easily inserted between the feed driving roller and the feed driven roller with a small force (in other words, it can easily pry off both rollers). Therefore, the transferred medium can be surely inserted between the feed driving roller and the feed driven roller without using a means for releasing the feed driven roller from the feed driving roller. Accordingly, it is possible to prevent increase in cost of the recording apparatus.

When the front end of the transferred medium is inserted between the feed driving roller and the feed driven roller, the insertion may be automatically performed by the use of a feeding means (for example, a discharge roller) provided downstream from the feed driving roller and the feed driven roller or may be manually performed by a user. That is, by the use of any method, it is possible to easily insert the transferred medium between the feed driving roller and the feed driven roller with a small force. In the former case, it is possible to precisely insert the front end of the transferred medium between the feed driving roller and the feed driven roller without any slip between the feeding means and the transferred medium.

Since the stress concentrated part is integrally formed with the transferred medium, the increase in cost of the transferred medium can be prevented and the strength is enhanced, thereby making it difficult to damage the transferred medium when the transferred medium is inserted between the feed driving roller and the feed driven roller. In addition, since the bottom surface of the transferred medium is smooth without any step difference, it is possible to precisely transfer the transferred medium in the secondary scan direction. The "front end" of the transferred medium represents an end in the transferring direction of the transferred medium (the end of the transferred medium which is a front side when the transferred medium is inserted between the feed driving roller and the feed driven roller).

In a second aspect of the present invention, the stress concentrated part may be a projection part projected in a transferring direction of the transferred medium.

According to the aspect described above, since the stress concentrated part is the projection part projected in the transferring direction of the transferred medium, it is possible to form the stress concentrated part with a simple structure and low cost.

According to a third aspect of the present invention, there is provided a transferred medium having a plate shape that can be nipped between a feed driving roller which rotates and a feed driven roller which rotates in close contact with the feed driving roller and being transferred in a secondary scan direction in response to the rotation of the feed driving roller, wherein a projection part projected in a transferring direction of the transferred medium is integrally formed at the front end of the transferred medium with the transferred medium.

According to the aspect described above, the projection part projected in the transferring direction of the transferred medium is integrally formed at the front end of the transferred medium with the transferred medium. Accordingly, when the transferred medium is nipped between the feed driving roller and the feed driven roller, the projection part is first inserted between the feed driving roller and the feed driven roller, the main body of the transferred medium is accordingly inserted between the feed driving roller and the feed driven roller, and the transferred medium is finally nipped between both rollers. That is, since the area of the front end of the transferred medium (as seen in the plan view) is extremely reduced by the projection part, the transferred medium can be easily inserted between the feed driving roller and the feed driven roller with a small force (In other words, it can easily pry off both rollers). Therefore, the transferred medium can be surely inserted between the feed driving roller and the feed driven roller without using a means for releasing the feed driven roller from the feed driving roller. Accordingly, it is possible to prevent increase in cost of the recording apparatus.

When the front end of the transferred medium is inserted between the feed 6 driving roller and the feed driven roller, the insertion may be automatically performed by the use of a feeding means (for example, a discharge roller) provided downstream from the feed driving roller and the feed driven roller or may be manually performed by a user. That is, by the use of any method, it is possible to easily insert the transferred medium between the feed driving roller and the feed driven roller with a small force. In the former case, it is possible to precisely insert the front end of the transferred medium between the feed driving roller and the feed driven roller without any slip between the feeding means and the transferred medium.

Since the projection part forms a body along with the transferred medium, the increase in cost of the transferred medium can be prevented and the strength thereof is enhanced, thereby making it difficult to damage the transferred medium when the transferred medium is inserted between the feed driving roller and the feed driven roller. In addition, since the bottom surface of the transferred medium is smooth without any step difference, it is possible to precisely transfer the transferred medium in the secondary scan, direction. The "front end" of the transferred medium means an end in the transferring-direction of the transferred medium (the end of the transferred medium which is a front side when the transferred medium is inserted between the feed driving roller and the feed driven roller).

In a fourth aspect of the present invention, the projection part may have a shape of a tongue. According to this aspect, since the projection part has the shape of a tongue, it is possible to secure the strength of the projection part.

In a fifth aspect of the present invention, the projection part may be tapered toward the tip as seen in a longitudinal section of the transferred medium.

According to this aspect, since the projection part is tapered toward the tip as seen in a longitudinal section of the transferred medium, it is possible to more easily insert the transferred medium between the feed driving roller and the feed driven roller.

In a sixth aspect of the present invention, the front end of the transferred medium may be tapered toward the tip as seen in the longitudinal section of the transferred medium and the top surface thereof may be not projected from the top surface of the projection part.

According to this aspect, since the front end of the transferred medium is tapered toward the up as seen in the longitudinal section of the transferred medium and the top surface thereof is not projected from the top surface of the projection past, the front end of the transferred medium can be smoothly inserted between the feed driving roller and the feed driven roller without jam when it is inserted therebetween. That is, in the structure that a plurality of feed driven rollers are arranged in the width direction of the transferred medium, when the transferred medium is fed to the feed driving roller and the feed driven rollers and the projection part passes between the feed driving roller and the feed driven rollers, the feed driven rollers closely contacting the projection part and the feed driven rollers having a free state where it does not closely contact the projection part may be mixed. At this time, the feed driven rollers in the free state has a smaller gap from the feed driving roller than that of the feed driven rollers closely contacting the projection part. Therefore, in this state, when the front end of the transferred medium following the projection part passes between the feed driving roller and the feed driven rollers, the front end of the transferred medium may be jammed by the feed driven rollers.

However, since the front end of the transferred medium is tapered, the front end of the transferred medium can be allowed to pass between the feed driving roller and the feed driven rollers smoothly without jam. In addition, since the top surface of the front end of the transferred medium is not projected from the top surface of the projection part, a prying effect between the feed driving roller and the feed driven roller by the projection part cannot be hindered.

In a seventh aspect of the present invention, the bottom surface of the projection part may form a flat plane along with the bottom surface of the transferred medium.

According to this aspect, since the bottom surface of the projection part form a flat plane along with the bottom surface of the transferred medium, the bottom surface of the transferred medium is smooth without any step difference and it is thus possible to precisely transfer the transferred medium in the secondary scan direction.

In an eighth aspect of the present invention, the projection part may be tapered toward the tip as seen in a plane view of the transferred medium.

According to this aspect, since the projection part is tapered toward the tip as seen in a plane view of the transferred medium, it is possible to more easily insert the transferred medium between the feed driving roller and the feed driven roller.

In a ninth aspect of the present invention, a plurality of the projection parts may be provided at the front end of the transferred medium in a direction perpendicular to the transferring direction of the transferred medium with a predetermined pitch.

According to this aspect, since a plurality of projection parts are provided at the front end of the transferred medium in a direction perpendicular to the transferring direction of the transferred medium with a predetermined pitch, it is possible to prevent or reduce the skew of the transferred medium when the front end of the transferred medium is inserted between the feed driving roller and the feed driven roller.

In a tenth aspect of the present invention, the feed driven roller may be axially supported by a holder member which is biased such that the feed driven roller comes in close contact with the feed driving roller, and the projection part may come in close contact with the feed driven roller at a position spaced far from a position where a biasing means for biasing the holder member applies a biasing force to the holder member.

Since the projection part comes in close contact with the feed driven roller at a position spaced far from a position where the biasing means for biasing the holder member that axially supports the feed driven roller applies a biasing force to the holder member, it is possible to insert the transferred medium between the feed driving roller and the feed driven roller.

In an eleventh aspect of the present invention, the transferred medium may be a tray having a setting part in which a thin plate member can be set.

According to this aspect, since the transferred medium is a tray having a setting part in which a thin plate member such as an optical disk can be set, it is possible to obtain the same operations and advantages as this aspect from the tray in which the thin plate member can be set.

DETAILED DESCRIPTION OF THE INVENTION

Figure 1:
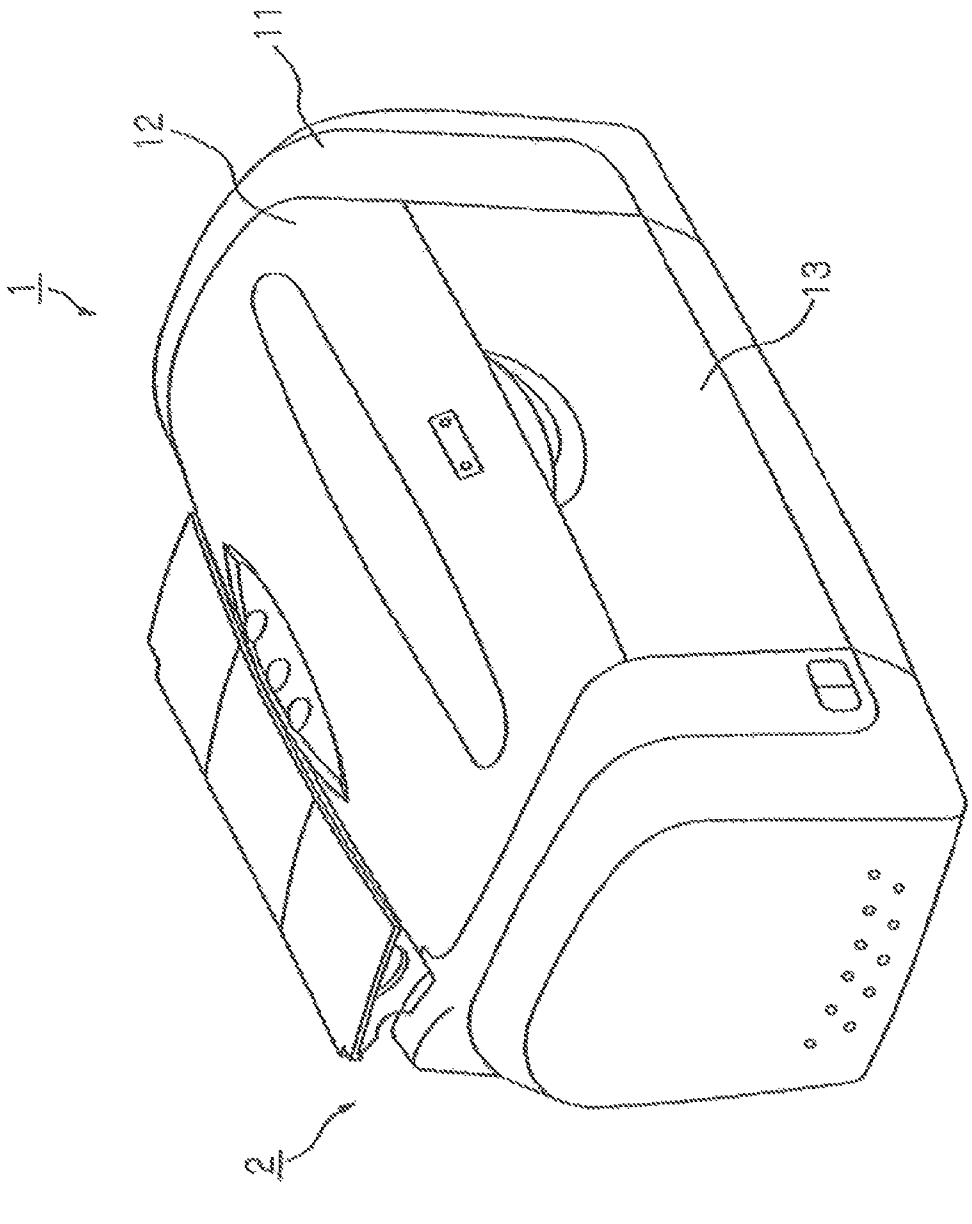
FIG. 1 is a perspective view illustrating an appearance of an inkjet printer.
Figure 2:
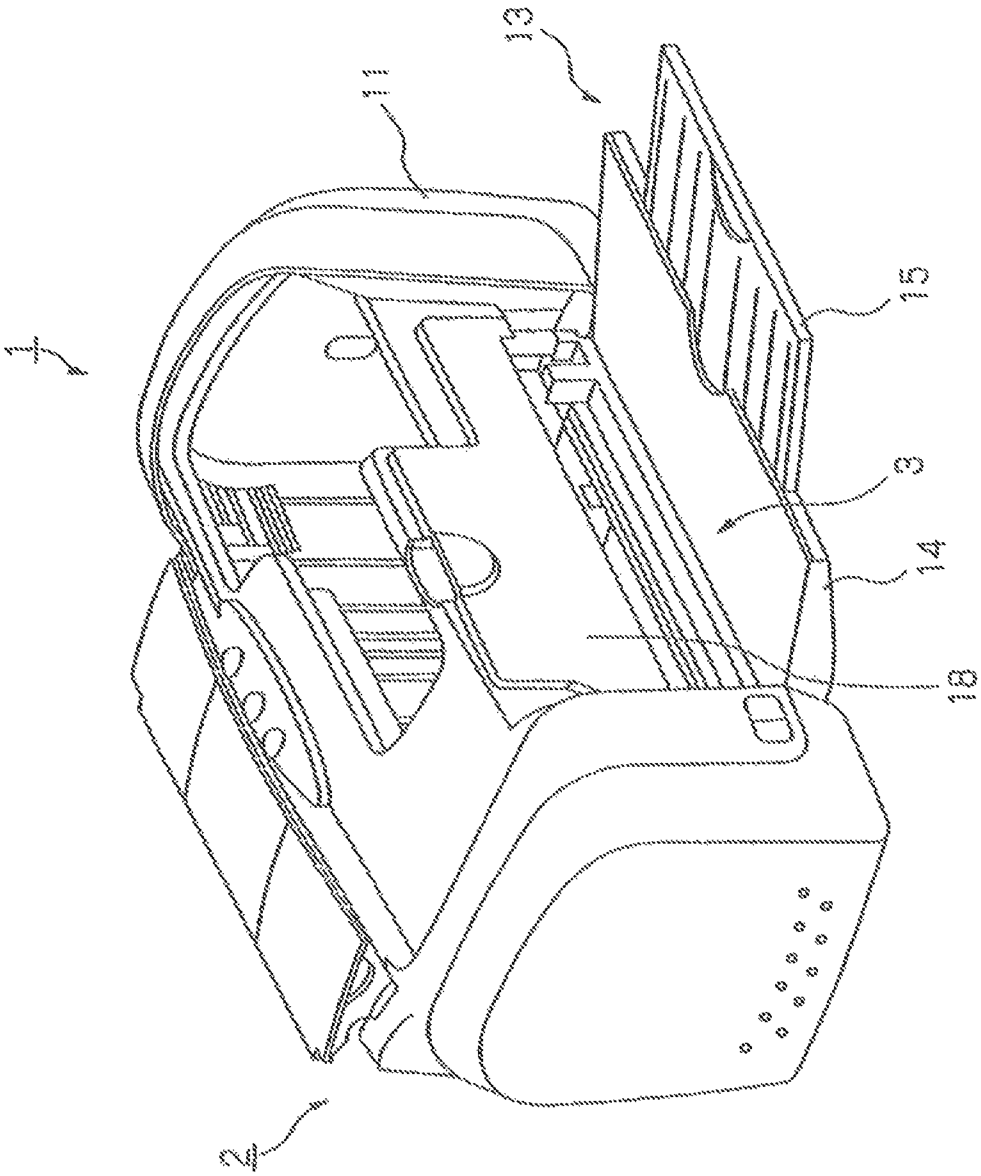
FIG. 2 is a perspective view illustrating an appearance of the inkjet printer.
Figure 3:
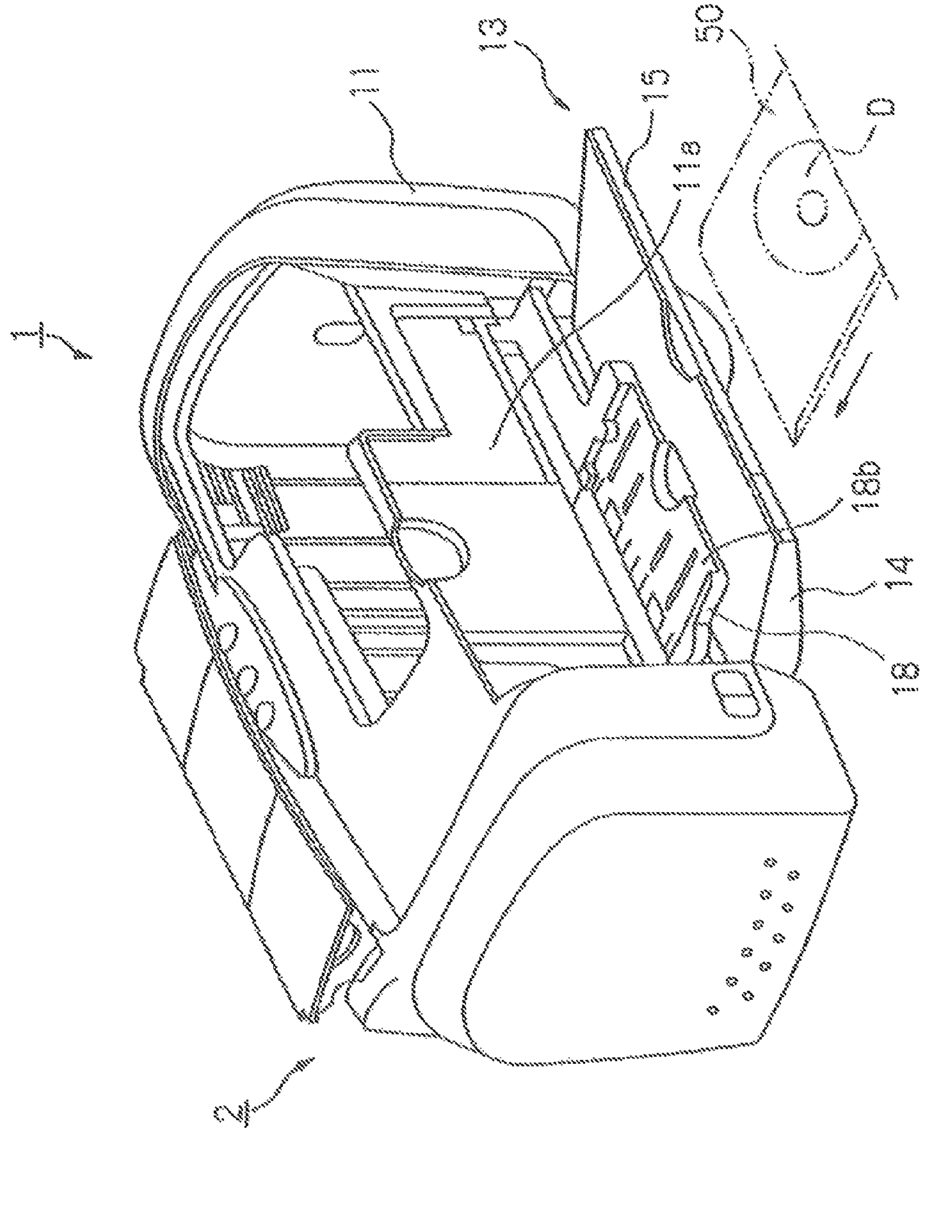
FIG. 3 is a perspective view illustrating an appearance of the inkjet printer.
Figure 4:
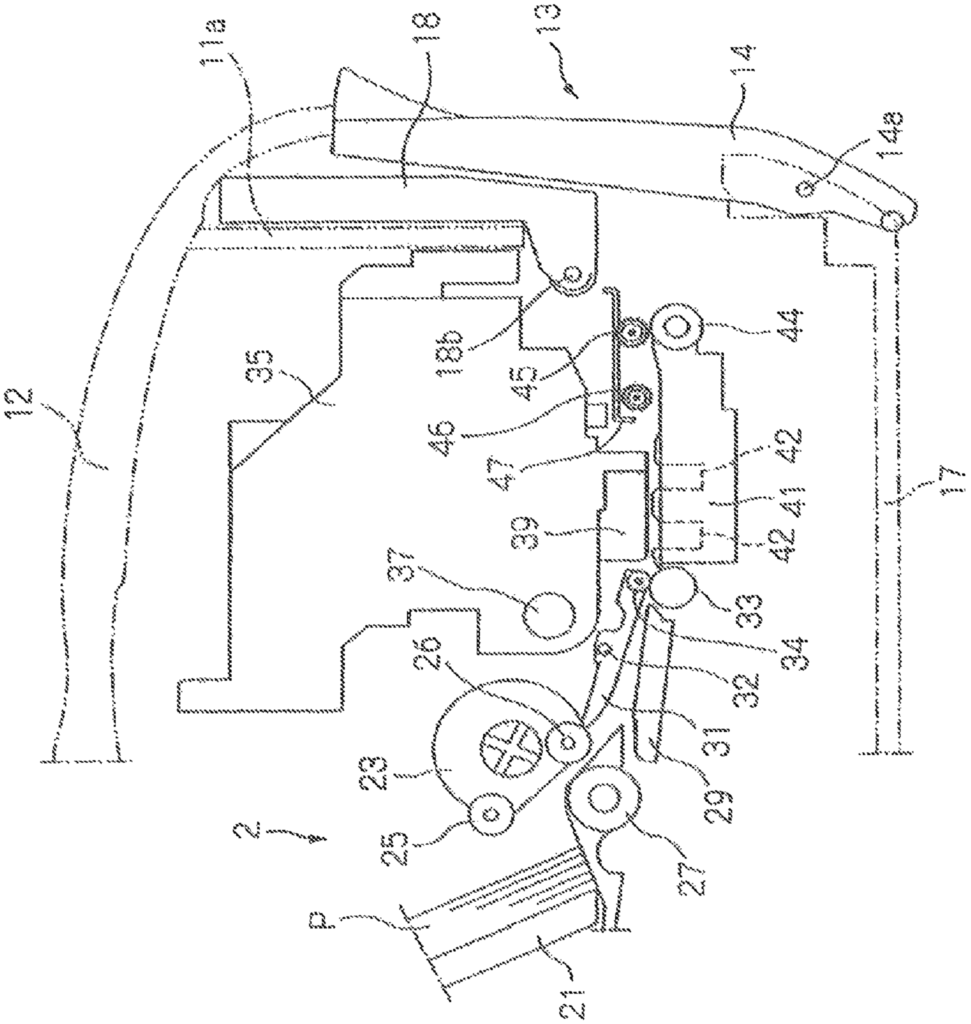
FIG. 4 is a side cross-sectional view schematically illustrating the inkjet printer.
Figure 5:
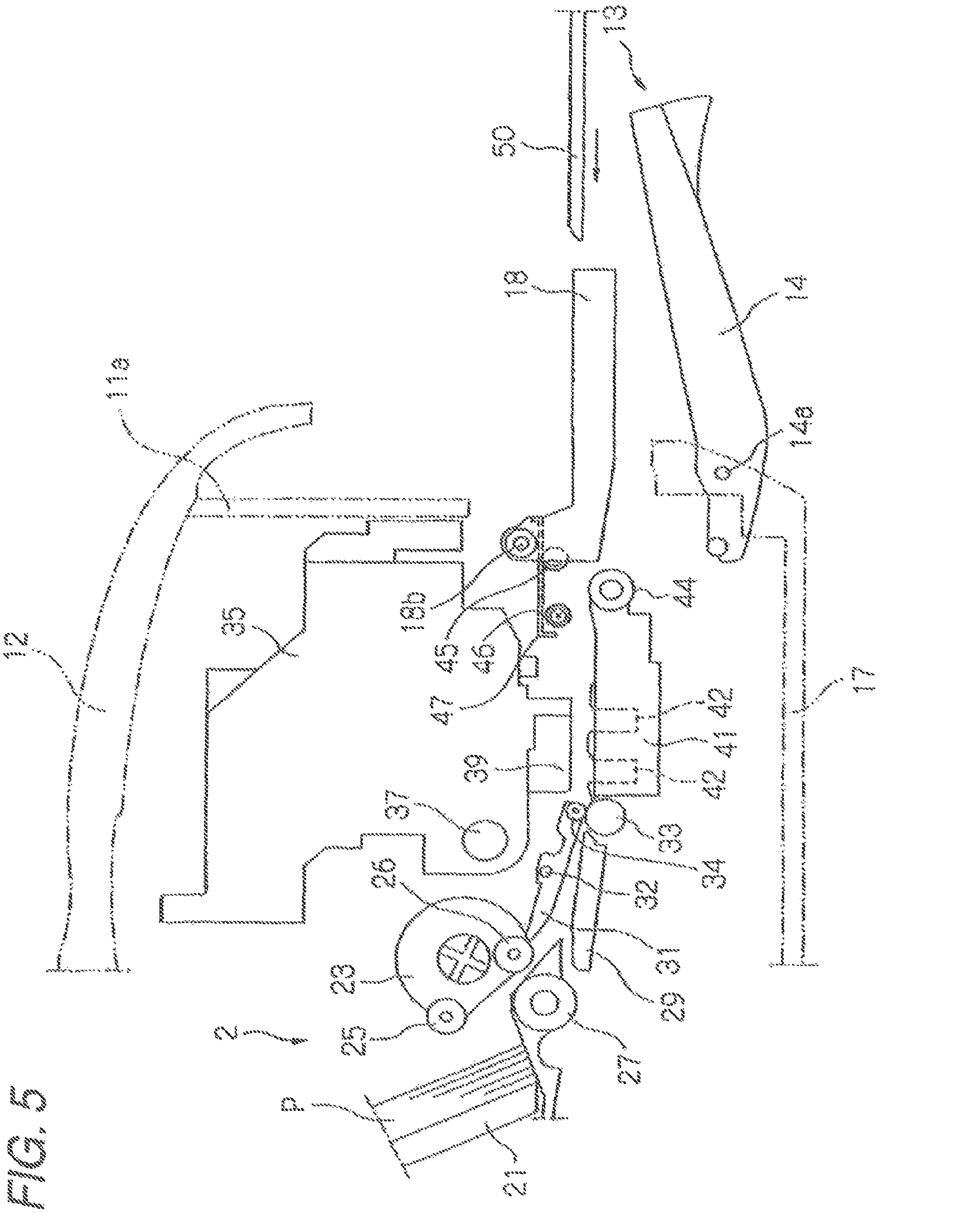
FIG. 5 is a side cross-sectional view schematically illustrating the inkjet printer.

Hereinafter, exemplary embodiments of the present invention will be described with reference to the drawings. Here, an inkjet printer 1 (hereinafter, referred to as "printer") as an example of a recording apparatus or a liquid jetting apparatus will be first schematically described with reference to FIGS. 1 to 5. FIGS. 1 to 3 are perspective views illustrating an appearance of the printer 1 and FIGS. 4 and 5 are side cross-sectional views of the printer 1. In the following description, the right side in FIGS. 4 and 5 (the front side of the printer) is referred to as the "downstream" of a paper feeding path and the left side (the rear side of the printer) is referred to as the "downstream" of the paper feeding path.

In FIG. 1, the printer 1 includes a feeding unit 2, in which a recording sheet (hereinafter, referred to as "paper P") as an example of a "recording medium" or a "transferred medium" can be set with a tilted posture, at the rear portion thereof and a stacker 13 which can switch an open state (FIG. 2) where the paper P can be stacked by opening the stacker to the front side of the printer and a closed state (FIG. 1) where the stacker is closed with the standing posture approximately perpendicular to the open state by the use of opening and shutting operations (rotation), at the front portion in a lower case 17 (see FIG. 4) constituting the bottom of the printer.

As shown in FIG. 2, the stacker 13 includes a stacker body 14 and a sub stacker 15 and can rotate around a rotation axis 14*a* (see FIGS. 4 and 5) of the stacker body 14. Accordingly, by drawing out the sub stacker 15 from the stacker body 14 in the open state where the stacker rotates to the front side of the printer, the stack surface for stacking the paper P is formed.

The outside of the printer 1 is covered with a housing 11 of a case shape and the central top portion of the housing 11 is provided with a cover 12 which can be opened and shut for performing replacement of an ink cartridge or the like. The feeding unit 2, the stacker 13, the housing 11, and the cover 12 constitute the appearance of the printer.

Now, a paper feeding path in the printer 1 will be described in detail with reference to FIGS. 4 and 5. In FIG. 4, the feeding unit 2 includes a hopper 21, a feeding roller 23, a retard roller 27, and a guide rollers 25 and 26 and feeds the set paper P sheet by sheet to a feed driving roller 33 and a feed driven roller 34 constituting a "feeding means" for feeding the paper P to an inkjet recording head 39.

More specifically, the hopper 21 has a plate shape and can shake about a shaking point (not shown) at the upper portion thereof. The hopper 21 brings the paper P supported on the hopper 21 into close contact with the feeding roller 23 or separates the paper from the feeding roller 23, by means of shaking. The feeding roller 23 has a "D" shape as seen in the side view and feeds the paper P pressed by its circular arc portion to the downstream on the other hand, in the course of carrying the paper P with the feed driving roller 33 and the feed driven roller 34 after feeding the paper P, the feeding roller is controlled such that its flat portion is opposed to the paper P so as not to generate any carrying load.

The retard roller 27 is provided to come in close contact with the circular axe portion of the feeding roller 23. When only a sheet of paper P is fed without feeding two or more sheets of paper P, the retard roller 27 rotates in contact with and along with the paper P (clockwise rotation in FIG. 4) and when plural sheets of paper P exist between the feeding roller 23 and the retard roller 27, the retard roller 27 does not rotate but stops because the frictional coefficient between the sheets of paper is smaller than the frictional coefficient between the paper P and the retard roller 27. Accordingly, the next sheet of paper P to be doubly fed does not advance downstream from the feeding roller 23 by the attraction of the uppermost sheet of paper P to be fed, thereby preventing two or more sheets of paper from being fed.

The guide rollers 25 and 25 are rotatably provided and perform a function of not bringing the sheet of paper P into contact with the feeding roller 23 to generate a carrying load in the course of carrying the sheet of paper P by the use of the feed driving roller 33 and the feed driven roller 34.

The paper P fed by the feeding unit 2 is guided to the guide 29 and reaches the feed driving roller 33 which rotates with a motor and the feed driven roller 34 which rotates in close contact with the feed driving roller 33. The feed driven roller 34 is axially supported by a holder 31 and the holder 31 is attached to a main frame (not shown) constituting a main body of the printer 1 through a twist coil spring (not shown). The paper P reaching the feed driving roller 33 is nipped between the feed driving roller 33 and the feed driven roller 34 and is fed to an area opposed to the inkjet recording head 39 downstream with the rotation of the feed driving roller 33. In the present embodiment, the diameter of the feed driving roller 33 is about 10 mm and the diameter of the feed driven roller 34 is about 5 mm.

At the downstream from the feed driving roller 33, the inkjet recording head (hereinafter, referred to as "recording head") 39 and a platen 41 opposed thereto are disposed. The recording head 39 is provided at the bottom of the carriage 35 and the carriage 35 reciprocates in a primary scan direction with a driving motor not shown under guidance of a carriage guide axis 37 extending in the primary scan direction. The carriage 35 is mounted with an individual ink cartridge (not shown) for each color and supplies ink to the recording head 39.

In the platen 41 regulating the distance between the paper P and the recording head 39, a rib is formed on the surface opposed to the recording head and concave portions 42 and 42 are formed thereon. The concave portions 42 serves to leave the ink jetted to areas departing from the ends of the paper P as it is. Accordingly, a so-called rimless printing that performs the printing without margin at the ends of the paper P can be performed. The concave portion 42 is provided with an ink absorbing member for absorbing the left ink and the ink is guided to a used ink tray (not shown) provided at the lower portion of the platen 41 from the ink absorbing member.

Subsequently, an assistant roller 46 and a discharge driving roller 44 and a discharging driven roller 45 constituting a "discharge means" are provided downstream from the recording head 39. A plurality of discharge driving rollers 44 are arranged in the axial direction of a shaft which rotates and the discharge driven roller 45 is provided in a frame 47 made of a metal plate which is longitudinal in the primary scan direction and rotates in close contact with the discharge driving roller 44. The sheet of paper P having been subjected to the recording by the recording head 39 is nipped between both rollers and then discharged to the stacker 13. The assistant roller 46 positioned upstream from the rollers rotates in close contact with the paper P from its top side and has a function of preventing the floating of the paper P and keep constant the distance between the paper P and the recording head 39.

Hitherto, the paper feeding path has been schematically described. The printer 1 can directly perform the printing to a label surface of an optical disk such as a compact disk in an inkjet manner, in addition to the paper P as the transferred medium. As shown in FIG. 3, the optical disk D as a "recording medium" or a "thin plate member" is fed over the linear paper feeding path in the printer 1, in a state that it is set in a tray 50 as a "transferred medium" having a plate shape. The tray 50 is provided independent of the printer 1 and is inserted toward the rear side (the left side in FIG. 5) of the printer 1 from the front side (the right side in FIG. 5) of the printer 1, while being supported by a tray guide 18 to be described later.

More specifically, in FIGS. 2 to 5, a reference numeral 18 denotes a tray guide for guiding the tray 50 when performing the recording to the optical disk D by the use of the tray 50. The tray guide 18 is provided downstream from the discharge driving roller 44 and the discharge driven roller 45 in a freely opening and shutting manner (in a rotatable manner) and can switch an open state for supporting the tray 50 by opening it toward to front side of the printer as shown in FIGS. 3 and 5 and a closed state where the tray guide is closed with the standing posture approximately perpendicular to the open state by the use of rotation as shown in FIGS. 2 and 4.

The tray guide 18 and the stacker 13 switches the open state and the closed state by the use of the same rotation as indicated by the change from FIG. 4 to FIG. 5. That is, they have the standing posture approximately vertical in the closed state and are in the using state by falling down from the standing posture to the from side of the printer. When they are in the closed state, the tray guide 18 is positioned inside the stacker 13 to be approximately parallel with the stacker 13 and when they are in the open state, the tray guide 18 is positioned on the stacker 13 to be approximately horizontal and the stacker 13 is maintained with a posture facing the upside so as not to allow the discharged paper P to fail down.

Figure 7:
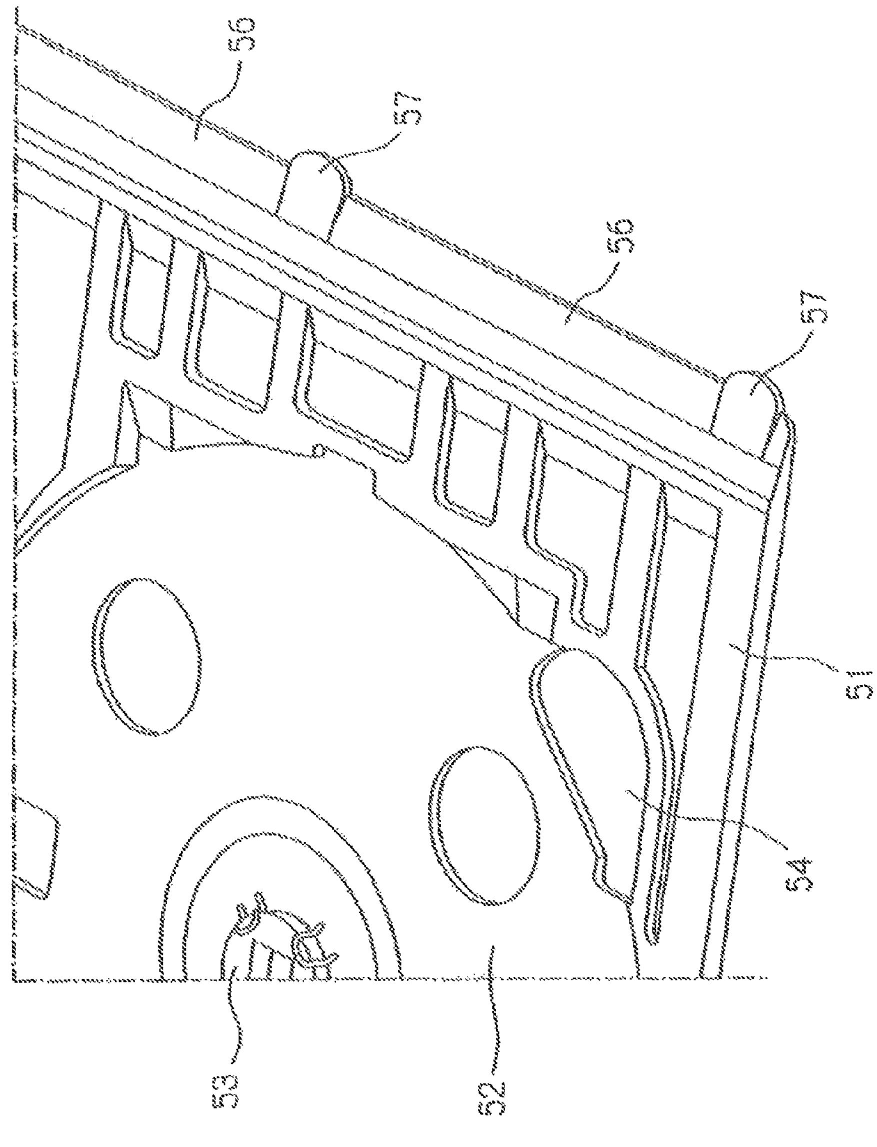
FIG. 7 is a perspective view illustrating an appearance of the tip of the tray according to an embodiment of the present invention.
Figure 8A:
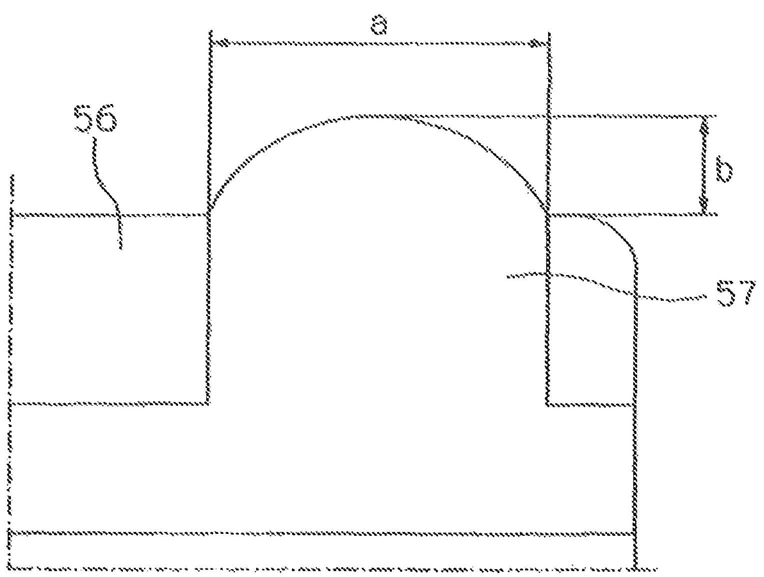
FIG. 8A is a plan view of a tongue piece and FIG. 8B is a side view of the tongue piece.
Figure 8B:
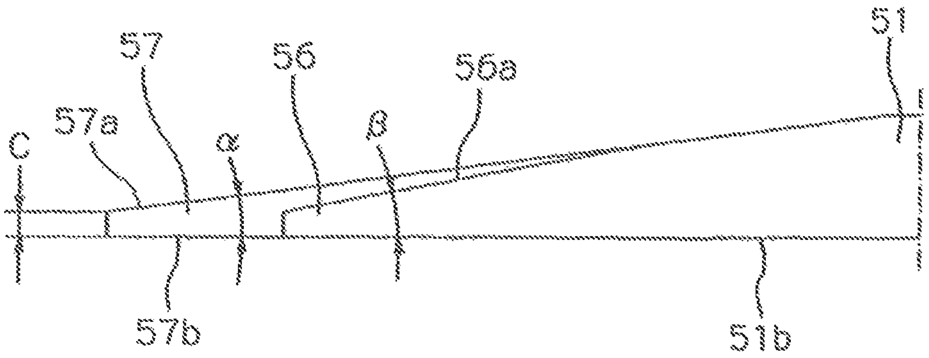
Figure 9A:
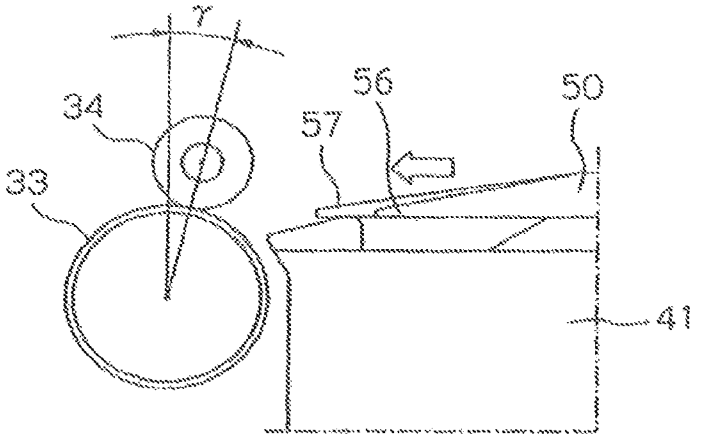
FIGS. 9A to 9C are diagrams illustrating an operation when the front end of the tray is inserted between a feed driving roller and a feed driven roller.
Figure 9B:
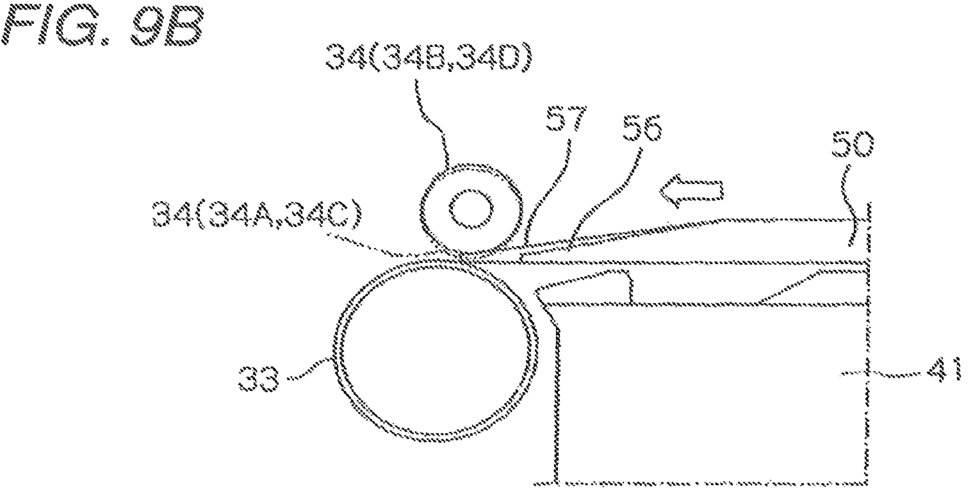
Figure 9C:
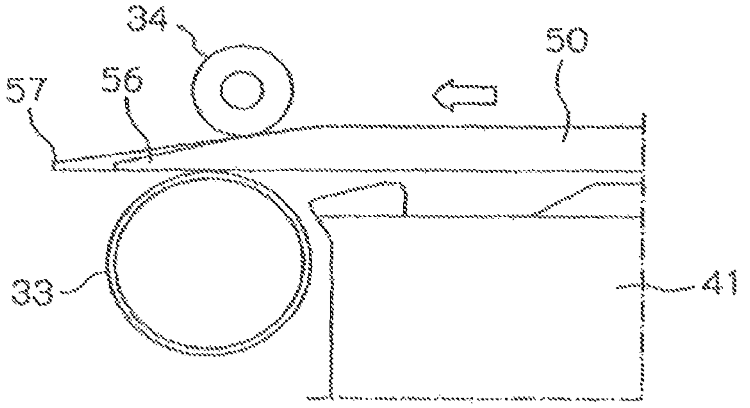
Figure 10:
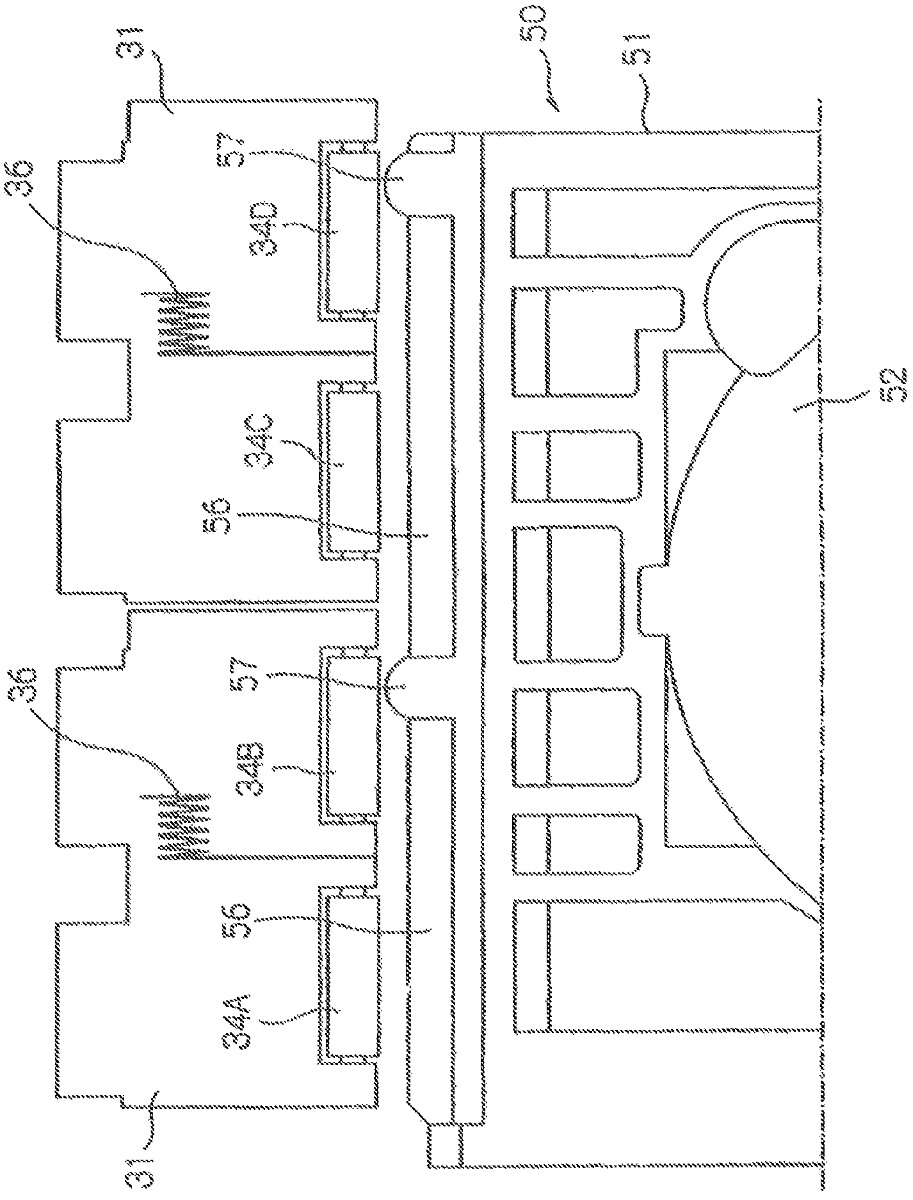
FIG. 10 is a plan view illustrating a positional relation between the feed driven roller and the tongue piece.

Hitherto, the schematic construction of the printer 1 has been described. Hereinafter, the tray 50 will be described in detail with reference to FIGS. 6 to 10. Here, FIG. 6 is a plan view of the tray 50, FIG. 7 is a perspective view illustrating an appearance of the front end of the tray 50, FIG. 8A is a plan view of a projection part 57, FIG. 8B is a side view of the projection part 57, FIGS. 9A to 9C are diagrams illustrating operations when the front end of the tray 50 is inserted between the feed driving roller 33 and the feed driven roller 34, and FIG. 10 is a plan view illustrating a positional relation between the feed driven roller 34 and the projection part 57.

Figure 6:
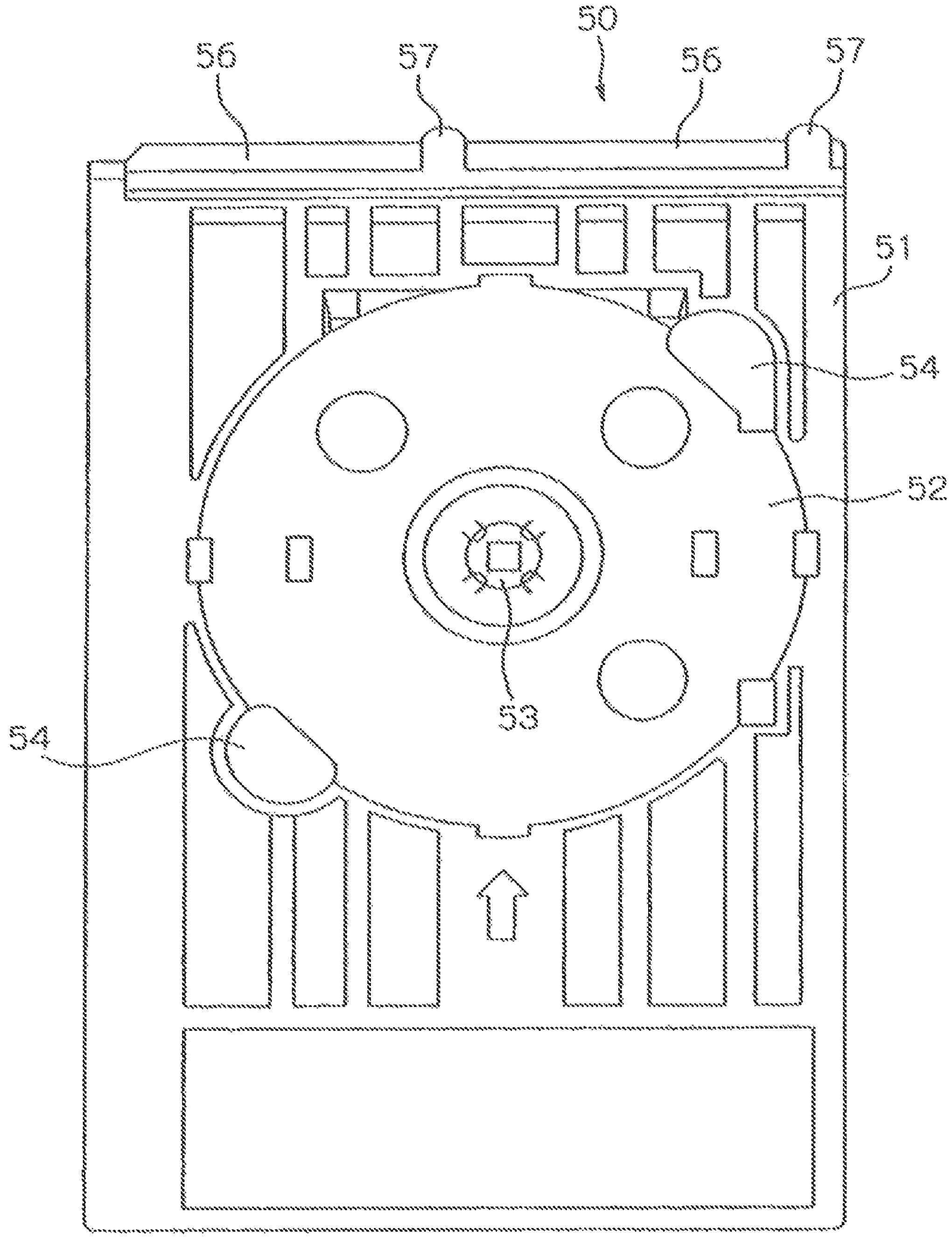
FIG. 6 is a plan view illustrating a tray according to an embodiment of the present invention.

As shown in FIG. 6, the tray 50 has a rectangular shape as seen in a plan view thereof and has a plate shape that can be nipped between the feed driving roller 33 and the feed driven roller 34 (FIG. 5). The tray 50 is transferred in the secondary scan direction in response to the rotation of the feed driving roller 33.

The tray 50 includes a tray body 51 and a setting part 52 and is integrally formed from a resin material. The setting part 52 is embodied as a concave portion having a circular shape as seen in the plane view shown in the figure. A convex portion 53 is formed at the center of the setting part 52 and when an optical disk D is set in the setting part 52, a central hole (not shown) of the optical disk D is fitted to the convex portion 53. Accordingly, the position of the optical disk D in the setting part 52 is determined. Holes 54 and 54 formed around the setting part 52 are holes for taking out (ejecting) the optical disk D.

The vertical direction in FIG. 6 is a transferring direction of the tray 50 and the top side in FIG. 6 is used as the front end when the tray 50 is inserted (fed) into the printer 1 through the tray guide 18 as shown in FIG. 3. That is, a reference numeral 56 denotes the front end of the tray 50. Tongue pieces 57 and 57 as the "projected part" are projected in the transferring direction (insertion direction) of the tray 50 at the front end of the tray 50 to be a body along with the tray 50, as shown in FIG. 7.

A plurality of tongue pieces 57 are arranged in a direction (the lateral direction, that is, the width direction, in FIG. 6) perpendicular to the transferring direction of the tray 50 with a predetermined pitch as shown in the figures. As seen in the plan view thereof, the tongue piece is tapered toward the tip thereof as shown in detail in FIG. 8A. In the present embodiment, the width "a" is set about 9 mm and the amount of protrusion "b" from the front end 56 is set about 3 mm. In the present embodiment, the tip of the tongue piece has a smooth arc shape as shown in the figures, but not limited to it, may have any shape only if it is tapered toward the tip. Alternatively, the tongue piece may have a shape not tapered toward the tip.

Next, the tongue piece 57 has the shape shown in FIG. 8B as seen in a longitudinal section of the tray 50 (a section obtained by cutting the tray 50 in the transferring direction). That is, the tongue piece is tapered toward the tip and the bottom surface 57*b* of the tongue piece form a flat plane along with the bottom surface 51*a* of the tray body 51.

The front end 56 of the tray 50 is tapered toward the tip, similar to the tongue piece 57, and the top surface 56*a* thereof is not projected upwardly from the top surface 57*a* of the tongue piece 57.

In the present embodiment, the thickness "c" of the tip of the tongue piece 57 is set about 0.5 mm, the tilted angle of the top surface 57*a* of the tongue piece 57 (tilted angle about the bottom surface 51*b* of the tray body 51) is set about 8.degree., the tilted angle of the top surface 56*a* of the front end 56 (tilted angle about the bottom surface 51*b* of the tray body 51) is set about 12.degrees.

Now, operations and effects of the tongue piece 57 will be described mainly with reference to FIG. 9. As described with reference to FIG. 3, when the tray 50 is inserted into the printer 1 (is fed over the paper feeding path), the tray is inserted toward the rear side of the printer 1 through the tray guide 18 by using the front end 56 of the tray 50 as the tip. At this time, the discharge driven roller 45 is in a state that it is separated from the discharge driving roller 44 as shown in FIG. 5 when the tray guide 18 is in the open state (in use). Accordingly, the tray 50 can be inserted (set) Into the printer 1 without bringing the optical disk D set in the tray 50 into contact with the discharge driven roller 45, that is, without damaging the optical disk D. In the present embodiment, when a user inserts (sets) the tray 50 into the printer 1, the front end of the tray 50 reaches the platen 41 (does not reach the feed driving roller 33 and the feed driven roller 34) and then the tray 50 is automatically transferred to the feed driving roller 33 and the feed driven roller 34 by means of a feeding means not shown.

Here, in order to transfer the tray 50 in the secondary scan direction by means of the rotation of the feed driving roller 33, it is necessary to insert the front end 56 of the tray 50 between the feed driving roller 33 and the feed driven roller 34 closely contacting the feed driving roller 33. However, the tongue pieces 57 projected in the transferring direction of the tray 50 are integrally formed at the front end 56 of the tray 50 with the tray 50. Accordingly, when the tray 50 is transferred to the feed driving roller 33 and the feed driven roller 34, the tongue pieces 57 are first inserted between the feed driving roller 33 and the feed driven roller 34 (FIG. 9B), the front end 56 of the tray 50 is then inserted between the feed driving roller 33 and the feed driven roller 34, and the tray 50 is finally nipped between both rollers (FIG. 9C).

That is, since the area of the front end of the tray 50 (as seen in the plan view) is extremely reduced by the tongue piece 57, the front end 56 of the tray 50 can be easily inserted between the feed driving roller 33 and the feed driven roller 34 with a small force (in other words, It can easily pry off both rollers with a small force). Therefore, the tray 50 can be surely inserted between the feed driving roller 33 and the feed driven roller 34 without using a means for releasing the feed driven roller 34 from the feed driving roller 33, thereby preventing increase in cost of the printer 1.

Since the tongue piece 57 is integrally formed with the tray 50 (the bay body 51), it is possible to prevent increase in cost of the tray 50 and to enhance the strength of the tray, thereby making it difficult to damage the tray 50 when it is fed. In addition, since the bottom surface 51*b* of the tray 50 (the tray body 51) can be formed smooth without any step difference, it is possible to precisely transfer the tray 50 in the second scan direction.

The tongue piece 57 may serve as a stress concentrated part (a part on which the largest stress acts in the present embodiment) on which the stress acting on the tray 50 is concentrated, when the tray 50 is inserted and kept between the feed driving roller 33 and the feed driven roller 34. That is, since the area of the front end of the tray 50 (as seen in the plan view) is extremely reduced by the stress concentrated part, the front end of the tray 50 can be easily inserted between the feed driving roller 33 and the feed driven roller 34 with a small force.

Since the tongue piece 57 is tapered toward the tip as seen in the longitudinal section of the tray 50, it is possible to more easily insert the tray 50 between the feed driving roller 33 and the feed driven roller 34. In addition, since the front end 56 of the tray 50 is tapered toward the tip as seen in the longitudinal section of the tray 50 and the top surface 56*a* thereof is not projected upwardly from the top surface 57*a* of the tongue piece 57, the front end 56 of the tray 50 can be inserted between the feed driving roller 33 and the feed driven roller 34 smoothly without jam when it is inserted therebetween.

That is, in the structure that a plurality of feed driven rollers 34 are provided in the width direction of the tray 50 as shown in FIG. 10, when the tray 50 is fed to the feed driving roller 33 and the feed driven rollers 34 and the tongue piece 57 passes between the feed driving roller 33 and the feed driven rollers 34, feed driven rollers (denoted by reference numerals 34B and 34D in FIG. 10) which come into close contact with the tongue piece 57 and feed driven rollers (denoted by reference numerals 34A and 34C in FIG. 10) which do not come into close contact with the tongue piece 57 and are kept in a free state exist together.

Here, the feed driven rollers 34A and 34C in a free state has a smaller gap from the feed driving roller 33 than that of the feed driven rollers 34B and 34D closely contacting the feed driving roller 33 (see FIG. 9B). Therefore, in this state, when the front end 56 of the tray 50 passes between the feed driving roller 33 and the feed driven rollers 34, the front end 56 of the tray 50 may be jammed by the feed driven rollers 33. However, since the front end 56 of the tray 50 is tapered as described above, the front end 56 of the tray 50 can be allowed to pass between the feed driving roller 33 and the feed driven rollers 34 smoothly without jam. In addition, since the top surface 56*a* of the front end 56 is not projected from the top surface 57*a* of the tongue piece 57, a prying effect between the feed driving roller 33 and the feed driven rollers 34 by the tongue piece 57 cannot be hindered.

Since the tongue piece 57 is also tapered toward the tip as seen in the plan view as described above, it is possible to more easily insert the tray 50 between the feed driving roller 33 and the feed driven rollers 34. In addition, since a plurality of tongue pieces 57 are arranged in the width direction of the tray 50 with a predetermined pitch, it is possible to prevent or reduce the skew of the tray 50 when the front end 56 of the tray 50 is inserted between the feed driving roller 33 and the feed driven rollers 34.

In addition, in the relation with the holder 31 which axially supports the feed driven rollers 34 as shown in FIG. 10, the tongue pieces 57 come in close contact with the feed driven rollers 34 at positions most apart from the position (in the present embodiment, approximately the center in the width direction of the holder 31 (in the direction perpendicular to the transferring direction of the tray 50)) where a twist coil spring 31 for biasing the holder 31 such that the feed driven rollers 34 come in close contact with the feed driving roller 33 applies the biasing force to the holder 31. That is, since the tongue pieces are disposed to come in close contact with the feed driven rollers 34 at the positions where the pressing force applied from the feed driven rollers 34 is smallest, it is possible to insert the tray 50 between the feed driving roller 33 and the feed driven rollers 34 with a smaller force.

In the present embodiment, in the relation with the holder 31 and the feed driven rollers 34 as shown in FIG. 10, two tongue pieces 57 are disposed approximately at the same positions, that is, at the positions where the pressing force applied from the feed driven rollers 34 are equal to each other. Specifically, in the present embodiment, the tongue piece is disposed at the position corresponding to the position deviated to right from the center in the width direction of the feed driven roller 34 (34B or 34D) axially supported at the right side (the right side in FIG. 10) of the holder 31 as shown in FIG. 10.

That is, the biasing force of the twist coil spring 36 acts on the approximate center in the width direction of the holder 31 and thus the feed driven, roller 34 is biased to come in close contact with the feed driving roller 33. Therefore, if the two tongue pieces come in close contact with the feed driving roller at different positions, the forces with which the feed driven rollers 34 press the tongue pieces 57, respectively, are different. Accordingly, the skew of the tray 50 may occur due to the non-uniform force when the tray is inserted between the feed driving roller 33 and the feed driven rollers 34.

However, as described above, since the two tongue pieces 57 are disposed at the substantially equal positions (positions where the pressing force from the feed driven roller 34 is smallest) in the positional relation with the holders 31 and the feed driven rollers 34 arranged in the width direction of the tray 50, the pressing force with which the feed driven rollers 34 press the tongue pieces 57 does not have deviation, thereby preventing the skew of the tray 50.

In the embodiments of the present invention, the tray 50 in which an optical disk D can be set as an example of the transferred medium has been exemplified. However, not limited to the tray 50, the same projection part may be integrally formed in a thick paper such as a board paper. As a result, it is possible to easily insert the thick paper between the feed driving roller 33 and the feed driven roller 34, without using a means for releasing the feed driven roller 34 and without causing damage at the time of feeding.

The invention claimed is:

1. A transferred medium that is formed into a plate shape and can be nipped between a first roller and a second roller, the second roller being provided in a holder member on which an urging force supplied by an urging member acts, thereby transferring the transferred medium into an apparatus, the transferred medium comprising:

a body part;

a setting part formed on one side of the body part and configured to have a recording medium set thereon; and a projection part projecting in a transferring direction of the transferred medium beyond a front end part of the body part, wherein in a cross sectional view taken along the transferring direction, at a position of a tip of the front end part, the thickness of the projection part is configured to be greater than the thickness of the front end part, wherein the width of the projection part in a direction perpendicular to the transferring direction is narrower than the width of the front end part in the direction perpendicular to the transferring direction, and wherein the urging force by the urging member acts on the projection part and the front end part during transfer of the transferred medium.

2. The transferred medium as set forth in claim 1, wherein the projection part is formed into a tapered shape toward a tip thereof in the cross sectional view taken along the transferring direction.

3. The transferred medium as set forth in claim 1, wherein the front end part is formed into a tapered shape toward the tip thereof in the cross sectional view taken along the transferring direction.

4. The transferred medium as set forth in claim 1, wherein the projection part is formed into a tapered shape toward a tip thereof such that a contact area between the projection part and the first roller gradually increases as the transferred medium is transferred in the transferring direction.

5. The transferred medium as set forth in claim 1, wherein the projection part is formed with a tapered surface configured to come into contact with the second roller.

6. A recording apparatus system, comprising:

a recording apparatus that includes a first roller, a second roller facing the first roller, a holder member provided with the second roller and an urging member configured to supply an urging force acting on the holder member; and a transferred medium that is formed into a plate shape and can be nipped between the first roller and the second roller, thereby transferring the transferred medium into the recording apparatus, the transferred medium comprising:

a body part;

a setting part formed on one side of the body part and configured to have a recording medium set thereon; and a projection part projecting in a transferring direction of the transferred medium beyond a front end part of the body part, wherein in a cross sectional view taken along the transferring direction, at a position of a tip of the front end part, the thickness of the projection part is configured to be greater than the thickness of the front end part, wherein the width of the projection part in a direction perpendicular to the transferring direction is narrower than the width of the front end part in the direction perpendicular to the transferring direction, wherein the urging force by the urging member acts on the projection part and the front end part during transfer of the transferred medium, wherein the recording apparatus transmits the urging force to the first roller through the second roller, and wherein the front end part is subjected to the urging force after the projection part is subjected to the urging force during transfer of the transferred medium.

7. The recording apparatus system as set forth in claim 6, wherein the width of the projection part is narrower than the width of the second roller in the direction perpendicular to the transferring direction.

* * * * *